(12) United States Patent
Arora et al.

(10) Patent No.: US 8,515,830 B1
(45) Date of Patent: Aug. 20, 2013

(54) DISPLAY OF ITEMS FROM SEARCH

(75) Inventors: Gagan K. Arora, Bellevue, WA (US); Anand Victor, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 138 days.

(21) Appl. No.: 12/732,249

(22) Filed: Mar. 26, 2010

(51) Int. Cl.
*G06Q 30/00* (2012.01)

(52) U.S. Cl.
USPC .......................... 705/27.1; 705/26.1

(58) Field of Classification Search
USPC .................... 705/26, 27, 26.1, 27.1
See application file for complete search history.

(56) References Cited

U.S. PATENT DOCUMENTS

| | | | |
|---|---|---|---|
| 6,751,600 B1 * | 6/2004 | Wolin .............................. | 706/12 |
| 6,947,936 B1 * | 9/2005 | Suermondt et al. ................... | 1/1 |
| 7,672,877 B1 * | 3/2010 | Acton et al. ................. | 705/26.1 |
| 2001/0044758 A1 * | 11/2001 | Talib et al. ...................... | 705/27 |
| 2002/0065744 A1 * | 5/2002 | Collins ........................... | 705/27 |
| 2004/0019536 A1 * | 1/2004 | Ashkenazi et al. ............. | 705/27 |
| 2006/0095370 A1 * | 5/2006 | Seth et al. ........................ | 705/40 |
| 2006/0282339 A1 * | 12/2006 | Musgrove et al. ............. | 705/27 |
| 2008/0162298 A1 * | 7/2008 | Aliabadi et al. ................ | 705/26 |

OTHER PUBLICATIONS

Ebays Apparel Push: New Selling Formats, More Brands in Wings. (Moin, David. WWD 199.39) (Feb. 22, 2010).*

* cited by examiner

*Primary Examiner* — Courtney Stopp
(74) *Attorney, Agent, or Firm* — Thomas | Horstemeyer, LLP

(57) ABSTRACT

Disclosed are various embodiments for determining categories of items to include in a search results page. Representative is a system comprising at least one computing device with a search engine and a network page build process that are executable therein. The search engine identifies a plurality of items to display in a network page in response to a request for search, wherein the items are classified in a plurality of categories. The network page build process applies one or more rules to determine one or more of the categories for which corresponding ones of the items are to be displayed in a network page.

16 Claims, 8 Drawing Sheets

DISPLAY OF ITEMS FROM SEARCH

BACKGROUND

Merchants who conduct electronic commerce by selling their goods over the Internet can provide various network pages that allow users to enter a search string from which a search may be performed in order to find one or more items desired by such users. It can be the case that users may enter very broad search strings that are difficult to narrow down to a particular genre of items desired by the users. As a consequence, the items displayed in a search result network page may vary widely, resulting in an unsatisfying user experience that may result in a loss of sales.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to determining the types of items and item classifications that are to be displayed to a user in response to a search request. In some cases, users may enter search terms during a search for items such as products, for example, that may be offered for sale through the online presence of a merchant. If the search terms are very broad, it may be the case that products from multiple unrelated categories are identified as responsive to the search terms entered. As a consequence, the user may be presented with many different products in the search results, where many of the products presented may be irrelevant to those desired by the user. In one embodiment, various categories or classifications of items are selectively presented to the user based on various factors as will be described. In the following discussion, a general description of the system and its components is provided, followed by a discussion of the operation of the same.

Figure 1:
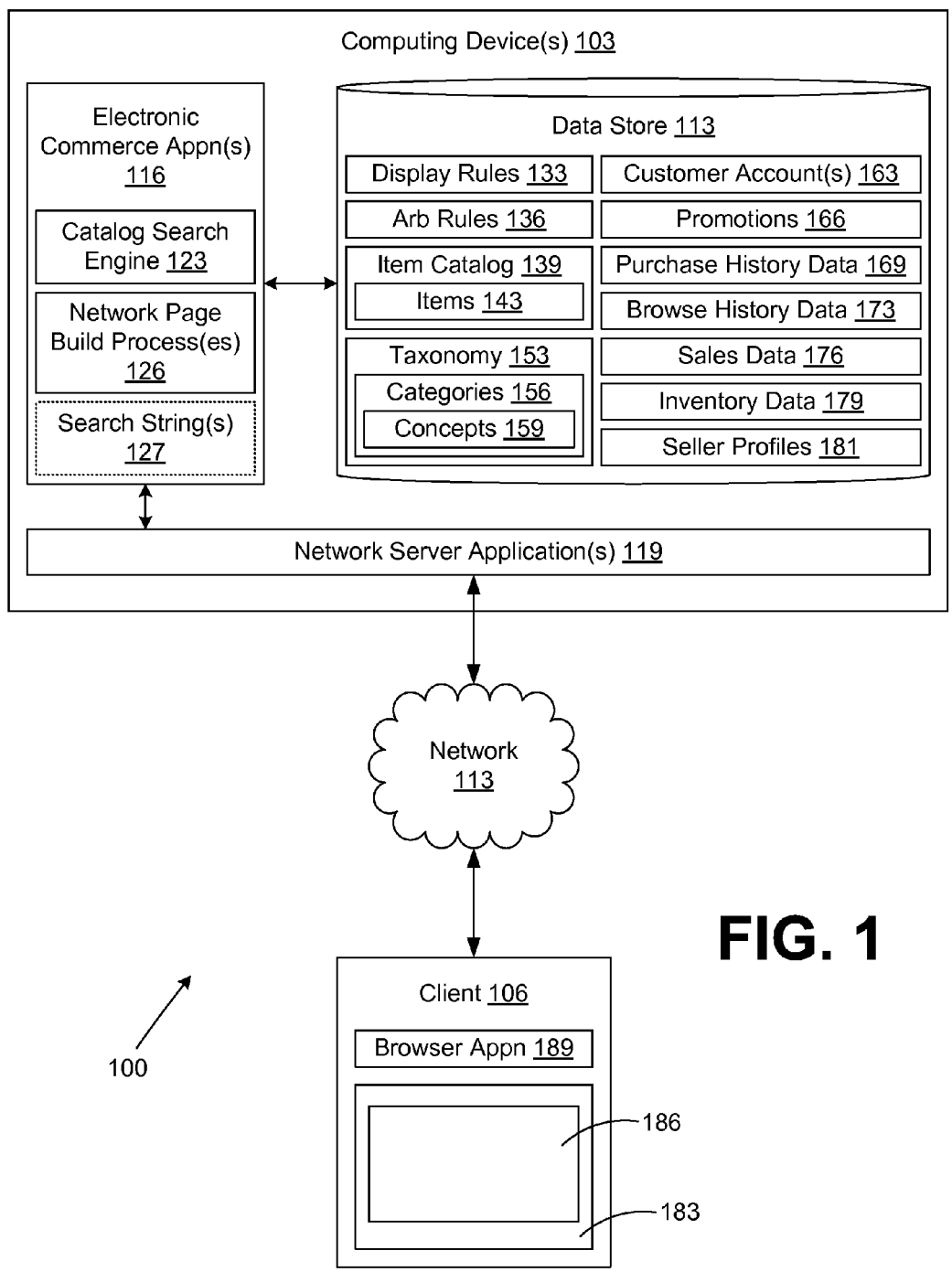
FIG. 1 is a drawing of a networked environment according to various embodiments of the present disclosure.

FIG. 1 shows a networked environment 100 according to various embodiments. The networked environment 100 includes a computing device 103 and a client 106, both of which are coupled to a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103 include, for example, an electronic commerce application 116, network server applications 119, and other applications, services, processes, systems, engines, or functionality not discussed in detail herein. Although the electronic commerce application 116 is referred to herein in the singular, it is understood that it may comprise a plurality of applications as can be appreciated. The electronic commerce application 116 is executed to provide for the online presence of one or more merchants to conduct electronic commerce over the network 109 which may comprise, for example, the Internet or other network as can be appreciated. The electronic commerce application 116 may be configured to facilitate the online presence of a single merchant, or it may facilitate a virtual marketplace that presents the online presence of many different merchants. In doing so, the electronic commerce application 116 provides for one or more network sites such as web sites and the like. The network server applications 119 are executed to provide network access to the electronic commerce application 116 and potentially other applications. In one embodiment, the network server applications 119 may comprise web servers or other types of network server applications 119 as can be appreciated.

The electronic commerce application 116 includes many different components such as, for example, a catalog search engine 123, network page build processes 126, and other applications or components. The catalog search engine 123 is implemented to search an item catalog 139 based on a search string 127 received from a client 106 as will be described. The network page build processes 126 are employed to generate various network pages 186 as will be described.

The data stored in the data store 113 includes, for example, display rules 133, arbitration rules 136, an item catalog 139, and potentially other data. The display rules 133 are employed to determine one or more categories 156 of items 143 that are to be displayed in a given network page 186 as will be described. The arbitration rules 136 are employed to determine an active set of display rules 133 to employ for this purpose. The item catalog 139 includes a plurality of items 143 that are sold through the network presence of the merchant. In one embodiment, the items 143 may comprise products such as goods and/or services.

In addition, stored in the data store 113 is a taxonomy 153 that includes a plurality of categories 156. Classified under each of the categories 156 are a number of concepts 159. The concepts 159 may be arranged in a tree extending under the categories 156 as will be described. In one embodiment, the taxonomy 153 serves to facilitate the user identification of products that they wish to purchase through the electronic commerce application 116 as will be described. In addition, other items 143 stored in the data store 113 include customer accounts 163, promotions 166, purchase history data 169, browse history data 173, sales data 176, inventory data 179, seller profiles 181, and other information.

The customer accounts 163 include information about customers such as, for example, their name, shipping addresses, billing addresses, payment instrument information, and other information about users typically held by online merchants to conduct electronic commerce with such customers. The promotions 166 may indicate special deals for items 143 sold through the electronic commerce application 116 and other data related to special offers for such items 143 as can be appreciated. The purchase history data 169 includes information about items 143 purchased by respective users. To this end, the purchase history data 169 may be stored in association with the customer accounts 163. Alternatively, the purchase history data 169 may be accessed for all users on an aggregate basis for various purposes as will be described. Similarly, the browse history data 173 includes information relating to the browse history for each customer that navigates through various network pages 186 of one or more network sites generated by the electronic commerce application 116 that provide for the online presence of one or more merchants. The browse history data 173 may be associated with each of the respective customer accounts 163, or may be stored in the aggregate to provide data for various purposes as will be described. The sales data 176 includes information about all of the past sales of items 143 through the network presence of one or more merchants as facilitated by the electronic commerce application 116.

The inventory data 179 includes information indicating the amounts of each of the items 143 that are currently stored in inventory and other information relating to inventory. Each of the seller profiles 181 includes information needed to facilitate the online presence of a corresponding one of a plurality of merchants. Such information may include seller name, address, financial information, and other information. Also, the display rules 133, arbitration rules 136, item catalog 139, and other components may include data that is associated with respective seller profiles 181. For example, a given merchant may provide their own catalog of items 143 that is included as a portion of the item catalog 139 along with items 143 from other merchants, etc.

The client 106 is representative of a plurality of client devices that may be coupled to the network 109. The client 106 may comprise, for example, a processor-based system such as a computer system. Such a computer system may be embodied, for example, in the form of a desktop computer, a laptop computer, a personal digital assistant, a cellular telephone, set-top box, music players, web pads, tablet computer systems, or other devices with like capability. The client 106 includes a display device 183 that may be employed to display network pages 186 and other content. The display device 183 may comprise, for example, a cathode ray tube (CRT), a liquid crystal display (LCD), or other type of display device 183 as can be appreciated.

The client 106 may be configured to execute various applications such as a browser 189 and/or other applications. The browser 189 may be executed in a client 106, for example, to access and render network pages 186, such as web pages, or other network content served up by the computing device 103 and/or other servers. The client 106 may be configured to execute applications beyond browser 189 such as, for example, email applications, instant message applications, and/or other applications.

Next, a general description of the operation of the various components of the networked environment 100 is provided. To begin, assume that a user may wish to purchase a desired product online through the electronic commerce application 116. The user enters the search string 127 into an appropriate text box in a respective network page 186 that is then transmitted to the computing device 103 from the client 106. The network server application 119 receives the search string 127 and initiates an instance of the network page build process 126 to generate a network page 186 that is responsive to the search request.

In generating a network page 186 that presents search results, the network page build process 126 provides the search string 127 to the catalog search engine 123 with a request to identify the plurality of the items 143 responsive to the search string 127. The catalog search engine 123 performs a search of the item catalog 139 based on the search string 127 to generate a list of items 143 responsive to the search string 127. According to one embodiment, the items 143 are classified in various categories 156 associated with the taxonomy 153. Alternatively, the categories 156 may be maintained in some other manner as can be appreciated.

Once the catalog search engine 123 obtains a listing of the various items 143 that are responsive to the search request, then the network page build process 126 proceeds to apply one or more display rules 133 to determine one or more of the categories 156 for which corresponding ones of the items 143 are to be displayed in a network page 186 responsive to the original request from the client 106.

In generating the respective network page 186, the network page build process 126 may be configured to identify a portion of the taxonomy 153 that is to be displayed in association with the items 143 from one or more respective categories 156. To this end, the portion of the taxonomy 153 may display one or more branches of a tree 203 of concepts 159 associated with one or more categories 156 as will be described. The display rules 133 may determine one or more of the categories 156 for which items 143 are to be displayed based at least in part upon various data stored in the data store 113 such as the customer account data 163, promotions 166, purchase history data 169, browse history data 173, sales data 176, inventory data 179, or other information as can be appreciated. Once the network page build process 126 identifies a respective category 156 for which items 143 are to be displayed in a given network page 186, then the network page build process 126 generates a network page 186 that includes a display of the respective items 143 for the corresponding one or more categories 156 that have been identified. Also, a portion of the taxonomy 153 is displayed with branches of concepts 159 of the identified categories 156 expanded as will be described. Thereafter, the network page 186 is transmitted to the client 106.

Figure 2:
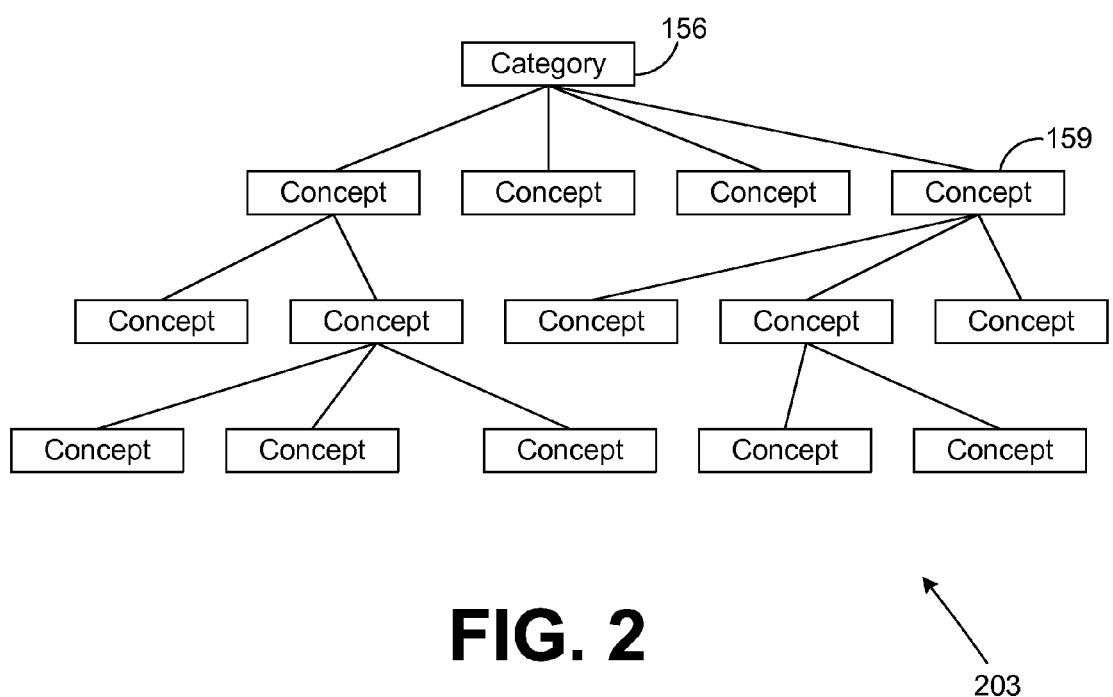
FIG. 2 is a drawing of an example of a portion of a taxonomy employed in a computing device in the networked environment of FIG. 1 according to various embodiments of the present disclosure.

Referring next to FIG. 2, shown is one example of a tree 203 that makes up a portion of the taxonomy 153 (FIG. 1) according to various embodiments. The tree 203 includes a category 156 and a plurality of concepts 159 that fall under such category 156. The concepts 159 may be information that can be used to narrow down a number of items 143 to be viewed in a network page 186. In one embodiment, each of the categories 156 exists at the top level of the taxonomy 153. Alternatively, any one of the concepts 159 at any level of the taxonomy 153 may be considered a category 156 and the concepts 159 that are subordinate to such category 156 may be considered branches of a tree 203 associated with such category 156 as can be appreciated. Thus, categories 156 may be defined at any level within a given tree 203 that makes up a portion of the taxonomy 153. As contemplated herein, the concept of expanding a tree 203 under a category 156 means that at least some concepts 159 classified under a category 156 are displayed relative to the category 156.

To give a concrete example, in the category 156 of electronics, subordinate concepts 159 may comprise TVs, radios, cameras, or other different types of electronics. There may be concepts 159 that are subordinate to concepts 159. For example, for a given concept of "TV" under a category of electronics, further subordinate concepts 159 may comprise the different screen sizes, different brands, or other concepts 159 as can be appreciated. Ultimately, each of the concepts 159 that are subordinate to a category 156 facilitate a further narrowing of a given search to hone in on desired products as can be appreciated.

Figure 3:
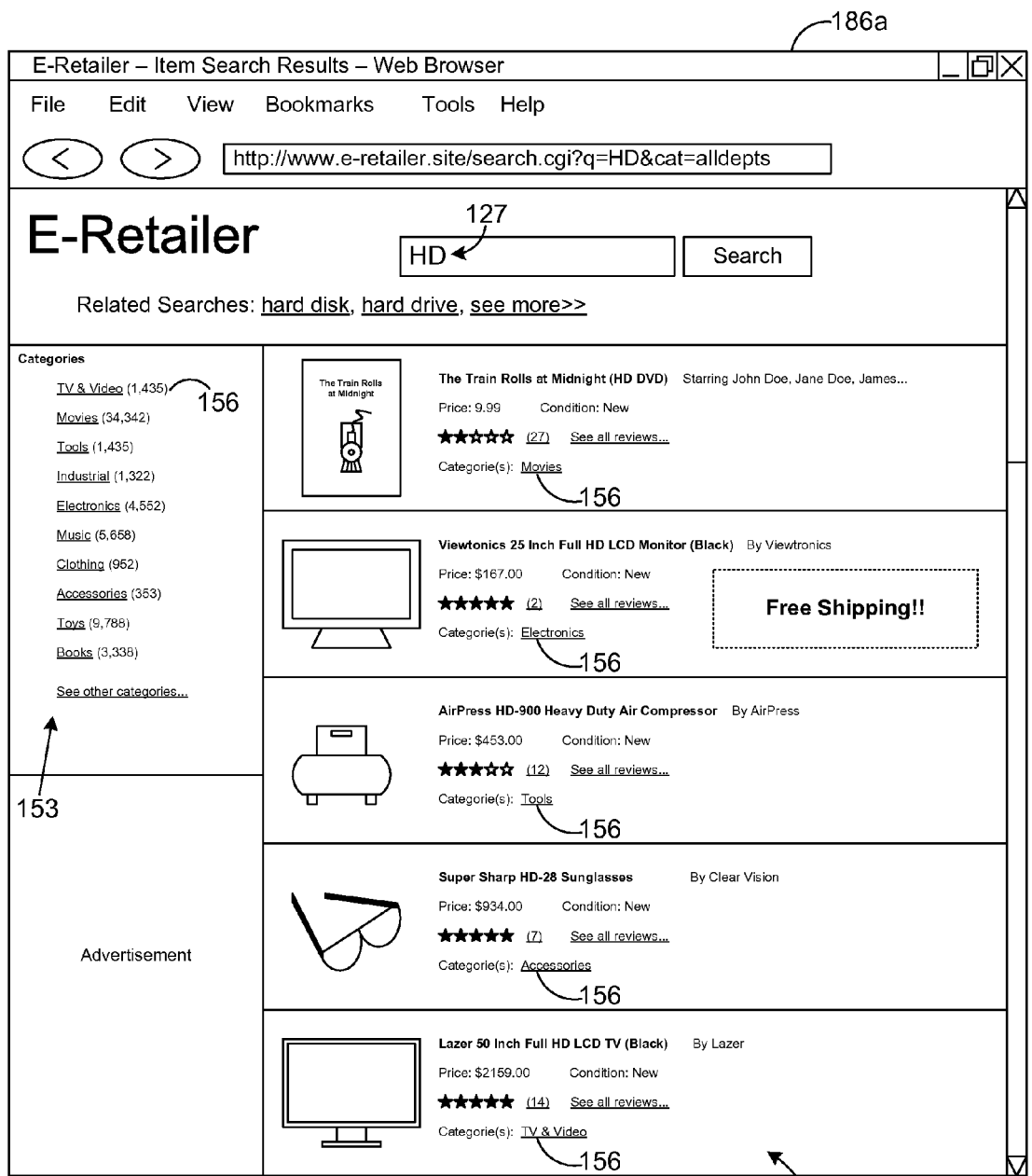
FIG. 3 is a drawing of one example of a network page generated by a computing device.

With reference next to FIG. 3, shown is one example of a network page 186 denoted herein as network page 186a. The network page 186a depicts the search results for a search performed based upon a search string 127 entered by a user through the client 106. The network page 186a includes a listing of items 143 that were obtained from a search performed based upon a search string 127 of "HD." To this end, the catalog search engine 123 (FIG. 1) will have performed a search through the item catalog 139 to identify those items 143 responsive to the search string 127.

In addition, the network page 186a includes a listing of a portion of the taxonomy 153 that comprises a listing of categories 156. Associated with each of the categories 156 is a number that indicates the number of items 143 responsive to the search string 127 that fall within such categories 156.

As can be seen, the items 143 responsive to the search string 127 are very diverse and stretch across multiple different categories 156. This is because the search string 127 of "HD" is rather broad and does not relate to a specific category 156 or a relatively small group of categories 156. This presents a problem in that the search results are much less likely to be relevant to the specific products sought by a user who entered the search string 127.

Figure 4:
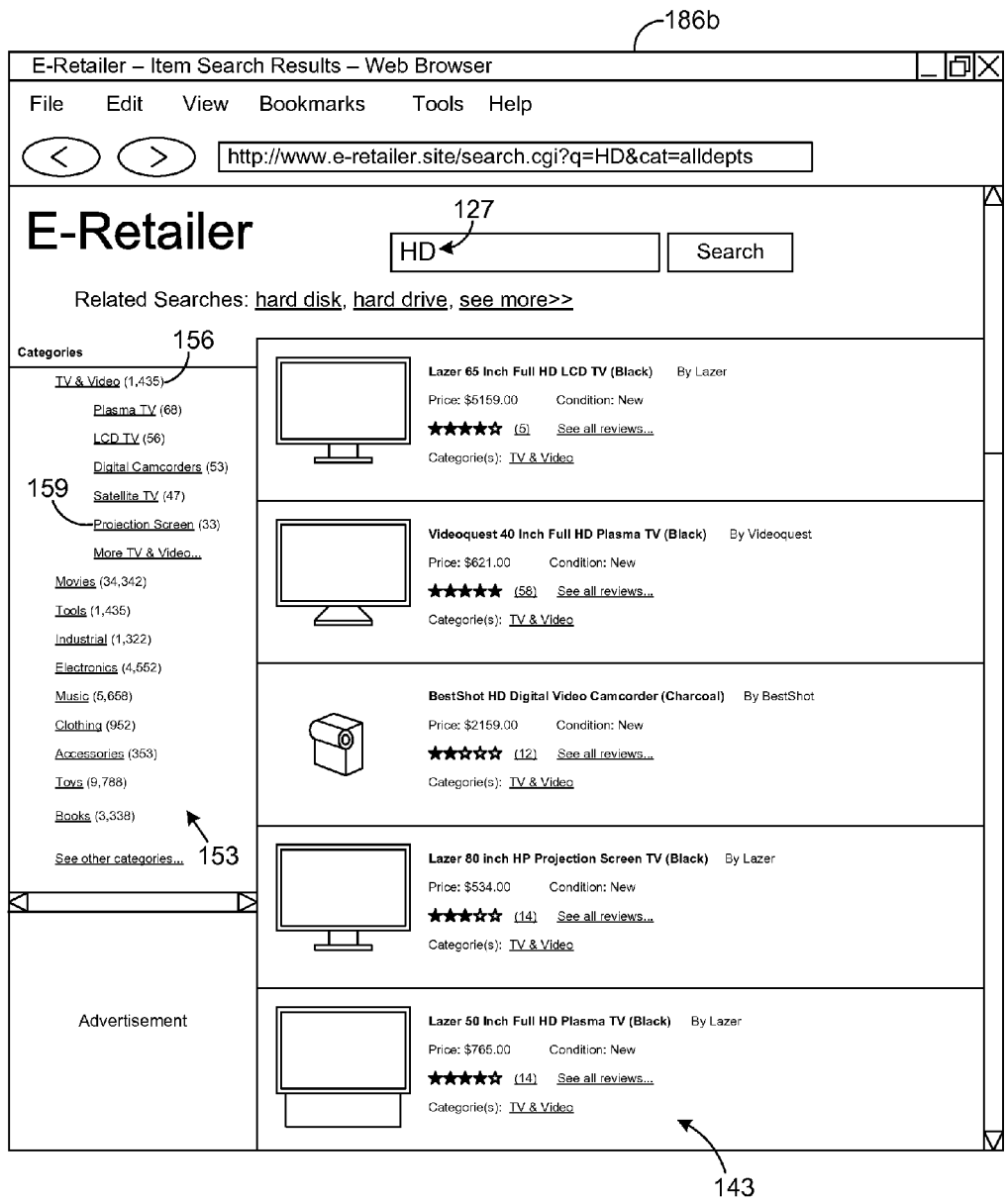
FIG. 4 is a drawing of one example of a network page generated by a computing device in the networked environment of FIG. 1 according to various embodiments of the present disclosure.

Referring next to FIG. 4, shown is another example of a network page 186 denoted herein as network page 186b according to various embodiments. As shown, the search string 127 (FIG. 1) has been entered by a user and the network page 186b shows the results of a search performed based upon the term "HD" as the search string 127. As shown, all of the items 143 listed in the network page 186b belong to a single category 156 of "TV and Video." In this situation, the network page build process 126 applied various display rules 133 in order to identify one or more categories 156 of items 143 that are to be displayed in situations where the search string 127 invoked items 143 from many different categories 156.

In addition, the portion of the taxonomy 153 depicted in the network page 186b includes concepts 159 that fall under the category 156 of "TV and Video." Each of the concepts 159 thus presents a branch on a tree 203 with the category 156 of "TV and Video" at the top of the tree 203. Stated another way, the category 156 of "TV and Video" is expanded to reveal a first level of a tree 203 of concepts 159 under the category 156. The network page 186b provides a user with a display of the respective branches under the category 156 of items 143 depicted as a result of the search performed. Thus, according to various embodiments, the items 143 displayed are narrowed to the single category 156 or an appropriate group of categories 156. In addition, a portion of the taxonomy 153 is displayed in association with the one or more categories 156 for which items 143 are displayed in the network page 186b. Such portion of the taxonomy 153 displays at least one or more branches of a tree 203 of concepts 159 associated with the respective category 156. The display of the tree 203 may show multiple levels as specified by a merchant as will be described.

Figure 5:
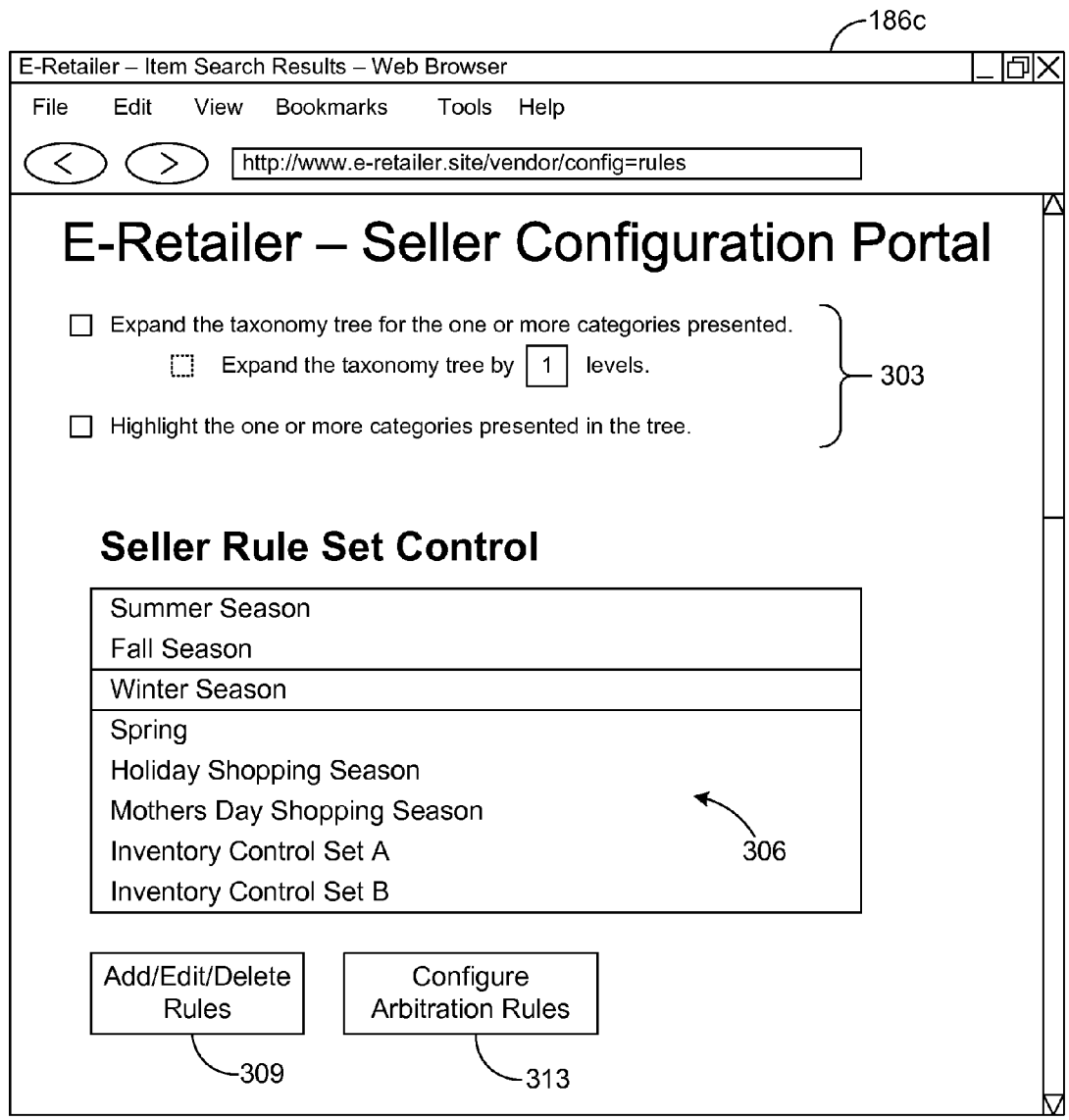
FIG. 5 is a drawing of an example of a network page generated by a computing device that provides for a portion of a seller portal in the networked environment of FIG. 1 according to various embodiments of the present disclosure.

With reference to FIG. 5, shown is one example of a network page 186 denoted herein as network page 186c according to various embodiments. The network page 186c comprises a portion of a seller portal that facilitates a seller specification of the display rules 133 (FIG. 1) and potentially the arbitration rules 136 (FIG. 1). In this respect, a seller can control how the network page build process 126 (FIG. 1) decides which category 156 (FIG. 1) or group of categories 156 for which items 143 (FIG. 1) are to be displayed in a given network page 186b (FIG. 4) in situations where the search string 127 (FIG. 4) is so broad as to include items 143 from many different categories 156. The seller specifies the display rules 133 that are applicable to the specific online presence of the seller.

The network page 186c includes display guidelines 303 that specify how a portion of the taxonomy 153 (FIG. 1) is to be depicted in the network page 186b according to various embodiments. For example, a seller may specify that the taxonomy 153 be expanded for one or more categories 156 for which items 143 are presented in the network page 186b as described above. Also, the seller may specify that branches of the taxonomy 153 can be expanded to a predefined number of levels as shown. Further, the seller may specify that one or more categories 156 that have been selected for presentation or display in the network page 186b be highlighted or otherwise changed in some manner to draw attention to the fact that the items 143 of such categories 156 are depicted. For example, the one or more categories 156 and associated concepts 159 may be featured using borders around such items 143, flashing such items 143, using a highlighted text, using text of a different font, using boldface text, or other means to highlight such elements.

In addition, the network page 186c includes a plurality of rule sets 306. Each rule set 306 may include one or more display rules 133 (FIG. 1). Associated with each of the rule sets 306 are arbitration rules 136 that indicate when such rule sets 306 are to be employed by the network page build process 126. For example, the arbitration rules 136 may specify time periods within which each one of the rule sets 306 is active to be employed by the network page build processes 126. Alternatively, the arbitration rules 136 may specify various conditions that dictate when a given rule set 306 or display rule 133 is to be applied to identify one or more of the categories 156 as mentioned above. The various conditions that may be specified may depend on many different events as can be appreciated.

The network page 186c also includes an "Add/Edit/Delete Rules" button 309 and a "Configure Arbitration Rules" button 313. The Add/Edit/Delete Rules button 309 may be manipulated in order to generate subsequent network pages 186 that facilitate adding, editing or deleting rules to a highlighted one of the rule sets 306. A seller may select any one of the rule sets 306 by clicking on the rule sets 306 with a cursor or by some other action. In addition, the Configure Arbitration Rules button 313 facilitates the generation of subsequent network pages 186c to allow sellers to specify the arbitration rules 136 that dictate when respective ones of the rule sets 306 can be employed. In one embodiment, the arbitration rules 136 are generated for a given highlighted one of the rule sets 306 when the Configure Arbitration Rules button 313 is pressed. Alternatively, at least some arbitration rules 136 may apply to all the rule sets 306. In one embodiment, one arbitration rule 136 that may be associated with each respective one of the rule sets 306 is a time period within which respective rule sets 306 are to be active during the course of a year, etc.

Figure 6:
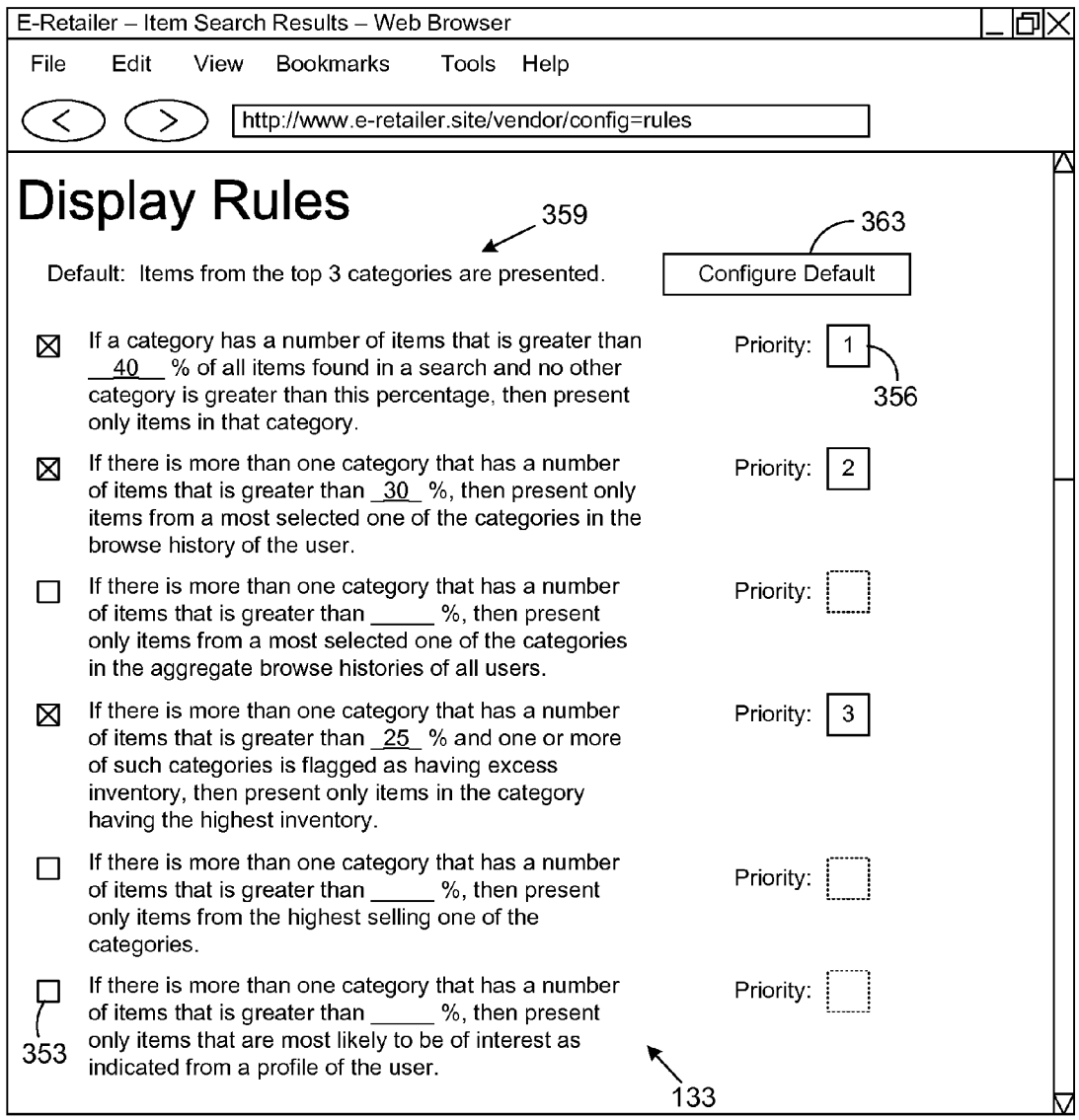
FIG. 6 is a drawing of another example of a network page generated by a computing device that provides for a further portion of the seller portal in the networked environment of FIG. 1 according to various embodiments of the present disclosure.

Referring next to FIG. 6, shown is an example of a network page 186 denoted herein as 186d according to various embodiments. The network page 186d comprises a second one of the network pages 186 that provides for a seller portal for a seller to specify the display rules 133 and the arbitration rules 136 (FIG. 1) that are employed to determine which categories 156 (FIG. 1) of items 143 (FIG. 1) are to be displayed in a network page 186b (FIG. 4) as described above. Thus, according to one embodiment, the seller or merchant may configure the display rules 133 and the arbitration rules 136 to their purposes in conducting their affairs on their network site.

The network page 186 includes a listing of display rules 133. The display rules 133 may be selected as active for use by the network page build processes 126 by manipulating toggle devices 353. In addition, at least some of the display rules 133 include a quantity field to enter a value that specifies a condition relating to the applicability of the respective display rule 133. For example, a given display rule 133 may state the following:

If a category has a number of items that is greater than N percent of all items found in a search, and no other categories are greater than this percentage, then present only items in that category.

Thus, the display rules 133 may be configured as desired by the sellers by selecting display rules 133 to employ, and specifying appropriate values associated with such display rules 133.

In one embodiment, a priority specification 356 is associated with each of the display rules 133. Each of the priority specifications 356 indicates the order in which the respective display rules 133 are to be considered by the network page build process 126. In addition, a default display rule 359 is specified in the case that none of the conditions specified by the selected display rules 133 specified by a user are applicable to a given search. According to one embodiment, a user may manipulate a "Configure Default" button 363 in order to access subsequent network pages 186 to specify the default display rule 359.

In one embodiment, the display rules 133 presented are only considered if the toggle devices 353 are active. Thus, a seller can specify those particular display rules 133 that they wish to employ in any given situation. In one embodiment, each rule set 306 (FIG. 5) may include the same set of rules, where different sets include different combinations of active ones of the display rules 133 and different priorities specified in the priority specification 356 for such display rules 133. In another embodiment, a single display rule 133 may be selected for a given rule set 306.

In another embodiment, a wizard or other application may be employed to generate the display rules 133. In such case, only those display rules 133 that are configured may be displayed in the network page 186d after implementation of the wizard or other application. In addition, it may be possible that individual display rules 133 may include their own arbitration rules 136 such that individual rules may be applied based upon whether the condition specified in the arbitration rules 136 are met. To this extent, the display rules 133 may each be assigned a priority based on a priority specification 356 and the actual set of display rules 133 that is to be considered by the network page build processes 126 in a given instance may be dynamic depending upon whether specific conditions specified by the respective arbitration rules 136 for each display rule 133 are met. As such, from instance to instance, different sets of display rules 133 may be considered in determining which categories 156 of items 143 to present to a user.

Figure 7:
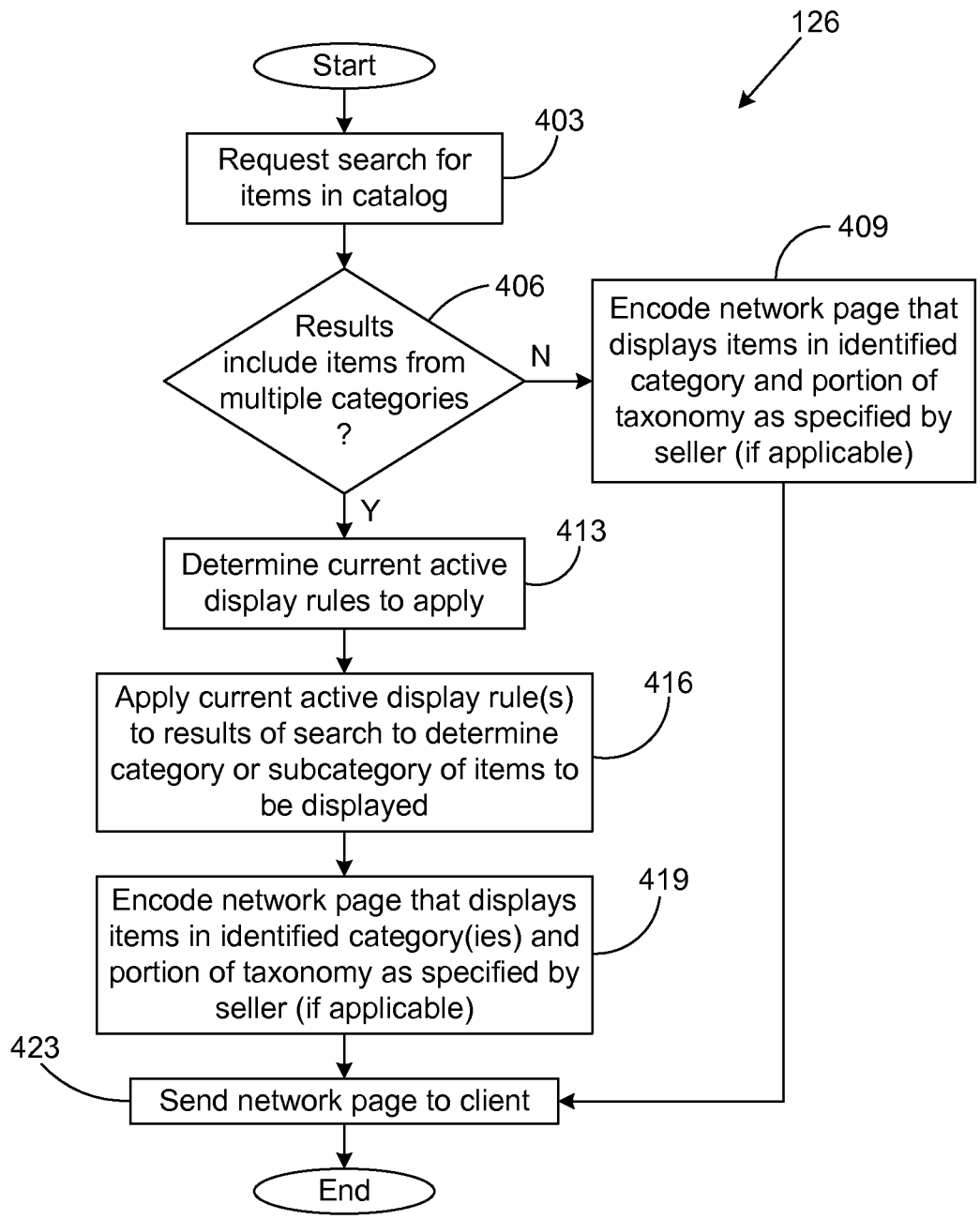
FIG. 7 is a flowchart illustrating one example of functionality implemented as a portion of a network page build process executed in a computing device in the networked environment of FIG. 1 according to various embodiments of the present disclosure.

Referring next to FIG. 7, shown is a flowchart that provides one example of the operation of a portion of the network page build process 126 according to various embodiments. It is understood that the flowchart of FIG. 7 provides merely an example of the many different types of functional arrangements that may be employed to implement the operation of the portion of the network page build process 126 as described herein. As an alternative, the flowchart of FIG. 7 may be viewed as depicting an example of steps of a method implemented in the computing device 103 (FIG. 1) according to one or more embodiments.

The flowchart of the FIG. 7 depicts at least a portion of the functionality of the network page build process 126 in generating a network page 186b (FIG. 4) that shows the results of a catalog search, where the items 143 (FIG. 1) listed belong to one or more categories 156 (FIG. 1) identified through an application of the display rules 133 (FIG. 1) as described above.

To begin, in box 403, the network page build process 126 requests the catalog search engine 123 (FIG. 1) to perform a search for items 143 in the item catalog 139 (FIG. 1) based upon a search string 127 (FIG. 1) received from a client 106 (FIG. 1). Thereafter, in box 406, it is determined once results are received from the catalog search engine 123 whether items 143 identified in the search are associated with multiple different categories 156 of the taxonomy 153. If not, then the network page build process 126 proceeds to box 409. On the other hand, if there are multiple different categories 156 represented, then the network page build process 126 proceeds to box 413.

In box 413, the network page build process 126 determines the current active display rules 133 to apply in determining one or more of the categories 156 for which respective items 143 are to be displayed in the network page 186b currently being constructed. This may be done, for example, by consulting the arbitration rules 136 to determine which of the display rules 133 are applicable in a given situation. The specific conditions surrounding the respective search, the time of the search, and other information may be relevant to the application of the arbitration rules 136 in a given situation that ultimately determines which display rules 133 are to be considered.

Next, in box 416, the network page build process 126 applies the current active display rules 133 to the results of the search to determine the one or more categories 156 of items 143 that are to be displayed. It should be noted that a category 156 may exist at any level within the taxonomy 153 (FIG. 1) and that categories 156 at all levels may be specified based on an application of the display rules 133 to be displayed.

The display rules 133 may relate to conditions associated with many different kinds of data stored in the data store 113. For example, the display rules 133 may determine a respective one or more of the categories 156 for which items 143 are to be displayed based at least in part upon a state of an inventory of one or more of the items 143 associated with such categories 156. For example, categories 156 having items 143 with higher levels of inventory as determined by predefined thresholds may be selected over categories 156 having lower levels of inventory.

Alternatively, the display rules 133 may determine one or more categories 156 based at least in part upon browse history data 173 (FIG. 1) or purchase history data 169 (FIG. 1) associated with a user or a plurality of users. To this end, the browse history data 173 and/or purchase history data 169 of one or more users may be consulted to determine preferences of a given user. A display rule 133 may be created, for example, that facilitates selection of categories 156 with items 143 that have been more frequently viewed or purchased relative to other categories 156.

Still further, the display rules 133 may determine the one or more categories 156 based at least in part upon sales data 176 associated with respective ones of the items 143 or with all items 143 in respective categories 156. For example, the sales data 176 may indicate the most popular items 143, where display rules 133 may select categories 156 if items 143 falling under such categories 156 have achieved sales above predefined thresholds, etc.

The display rules 133 may determine categories 156 based upon promotions 166 for items 143 or categories 156, or information about users stored in association with customer accounts 163. In particular, a customer account 163 may provide a profile from which a decision may be made based on appropriate display rules 133 as to which categories 156 of items 143 to present to such users. For example, a display rule 133 may specify certain categories 156 be selected based upon the gender of the user, etc.

Next, in box 419, the network page build process 126 encodes a network page 186d that displays the items 143 that are associated with the one or more identified categories 156 in accordance with the display rules 133 configured by the seller. In addition, the network page build process 126 includes the portion of the taxonomy 153 that displays one or more branches of a tree 203 of concepts 159 that are associated with the selected categories 156 in accordance with the display guidelines 303 (FIG. 5) as described above. Thereafter, in box 423, the network page build process 126 sends the respective network page 186 to the client 106 through the network server application 119 as can be appreciated.

Referring back to box 406, if the items 143 included in the results of the search are all associated with one category 156, then the network page build process 126 proceeds to box 409 to encode a network page 186 that displays such items 143 from the single category 156. In addition, the taxonomy 153 may be displayed with appropriate branches under the respective category 156 exposed as described above. The nature of the display of the taxonomy 153 will comport with a seller configuration as specified in the display guidelines 303 described above.

Figure 8:
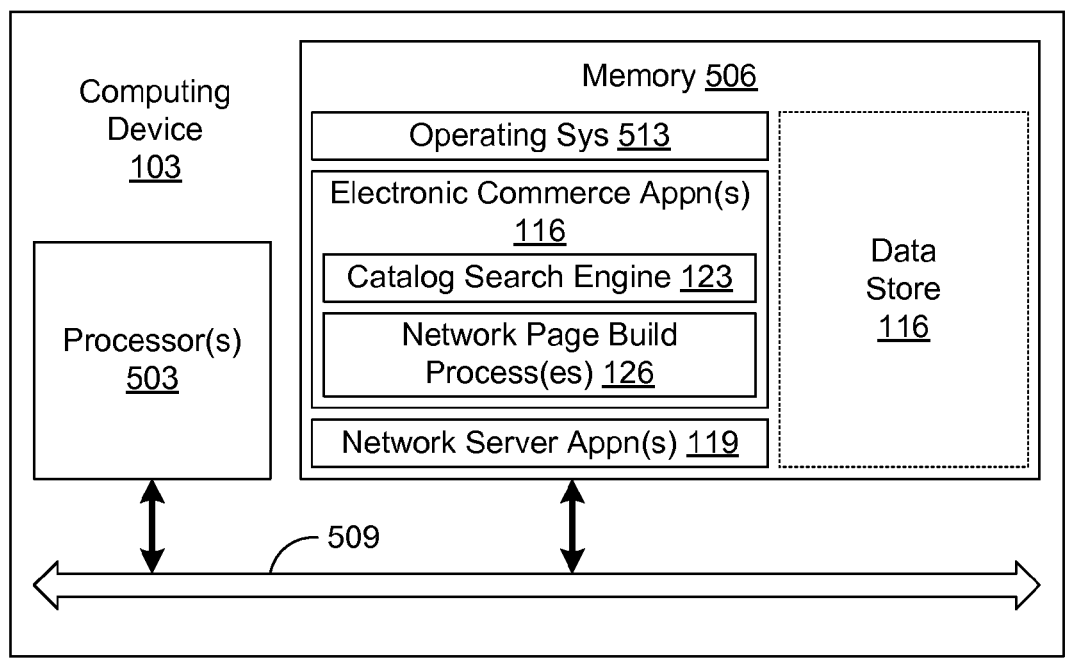
FIG. 8 is a schematic block diagram that provides one example illustration of a computing device employed in the networked environment of FIG. 1 according to various embodiments of the present disclosure.

With reference to FIG. 8, shown is a schematic block diagram of one example of a computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce application 116 that includes the catalog search engine 123 and the network page build process(es) 126, and potentially other applications. Also the data store 113 may be stored in the memory 506. In addition, an operating system 513 may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce application(s) 116, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 shows and example of the functionality and operation of an implementation of portions of the network page build process(es) 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application(s) 116 which further include the catalog search engine 123 and the network page build process(es) 126, that comprises software or code can be embodied in a non-transitory form in any computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that obtains a pool of products in response to a search request, each of the products being classified in at least one of a plurality of product categories, the product categories comprising at least a portion of a taxonomy, the portion of the taxonomy displaying at least one branch of a tree of concepts associated with the at least one of the product categories, and the products being offered for sale through a network presence;
   code that identifies one of a plurality of sellers based at least in part on the search request;
   code that obtains a plurality of seller-specified rules based at least in part on the identified one of the sellers;
   code that identifies a select one of the product categories through an application of the seller-specified rules;
   code that encodes a network page to be rendered on a client, the network page displaying a subset of the products in the pool, each of the products in the subset being associated with the select one of the product categories; and
   code that obtains a seller specification of at least one condition based at least in part on the identified one of the sellers, the at least one condition indicating a pre-defined priority for applying the seller-specified rules.

2. The non-transitory computer-readable medium of claim 1, wherein the seller-specified rules identify the select one of the product categories based at least in part upon at least one purchase history associated with at least one user.

3. The non-transitory computer-readable medium of claim 1, wherein the seller-specified rules identify the select one of the product categories based at least in part upon a past sales history of the products.

4. A system, comprising:
   at least one computing device;
   a search engine executing in the at least one computing device that identifies a plurality of items to display in a network page in response to a request for search; and a network page build process executing in the at least one computing device, the network page build process comprising:

logic that identifies one of a plurality of sellers based at least in part on the request;

logic that determines a plurality of seller-specified rules corresponding to the identified one of the sellers; and logic that applies the seller-specified rules to determine a plurality of categories for which corresponding ones of the items are to be displayed in the network page, the categories making up a portion of a taxonomy that is to be displayed in association with the items, the portion of the taxonomy displaying at least one branch of a tree of concepts associated with the categories, wherein each of the seller-specified rules are applied according to a predefined priority.

5. The system of claim 4, wherein the items comprise products sold through a network presence of the sellers, and the network page displays the items as a result of the search, where the search comprises a product search.

6. The system of claim 4, wherein the network page build process further comprises logic that encodes for display in the network page at least the portion of the taxonomy displaying at least one branch of the tree of concepts.

7. The system of claim 4, further comprising a seller portal implemented in the at least one computing device, the seller portal being configured to receive an input of at least one of the seller-specified rules.

8. The system of claim 4, wherein the seller-specified rules are organized into a plurality of sets of rules, and the system further comprising:

a seller portal implemented in the at least one computing device;

the seller portal comprises a plurality of network pages, wherein each of the network pages is configured to receive an input of at least one of the sets of the rules.

9. The system of claim 8, wherein the network page build process further comprises logic that determines which ones of the sets of rules is to be applied to determine the at least one of the categories for which corresponding ones of the items are to be displayed in the network page.

10. The system of claim 4, wherein at least one of the seller-specified rules determines the at least one of the categories based at least in part upon a state of an inventory of at least one of the items.

11. The system of claim 4, wherein at least one of the seller-specified rules determines the at least one of the categories based at least in part upon at least one search history associated with a corresponding at least one user.

12. The system of claim 4, wherein at least one of the seller-specified rules determines the at least one of the categories based at least in part upon a past sales history of the plurality of items.

13. A method, comprising the steps of:

classifying, in at least one computing device, each one of a plurality of items sold through a network presence in at least one of a plurality of categories;

obtaining, in the at least one computing device, a collection of the items in response to a search request in the at least one computing device;

identifying, in the at least one computing device, one of a plurality of sellers participating in the network presence;

obtaining, in the at least one computing device, a seller specification of at least one rule based at least in part on the identified one of the sellers;

identifying, in the at least one computing device, at least one of the categories through an application of the at least one rule;

identifying, in the at least one computing device, a portion of a taxonomy that is to be displayed in association with the at least one of the categories;

encoding, in the at least one computing device, a network page to be rendered on a client, the network page displaying the portion of the taxonomy, the portion of the taxonomy including at least one branch of a tree of concepts associated with a subset of the items in the collection, each of the items in the subset being associated with the at least one of the categories; and obtaining, in the at least one computing device, a seller specification of at least one condition based at least in part on the identified one of the sellers, the at least one condition dictating a pre-defined priority for applying the seller-specified rules.

14. The method of claim 13, wherein the at least one rule determines the at least one of the categories based at least in part upon a state of an inventory of at least one of the items.

15. The method of claim 13, wherein the at least one rule determines the at least one of the categories based at least in part upon a profile describing a user.

16. The method of claim 13, wherein the at least one rule determines the at least one of the categories based at least in part upon a past sales history of a user.

* * * * *